United States Patent [19]
Heyl et al.

[11] Patent Number: 5,570,296
[45] Date of Patent: Oct. 29, 1996

[54] SYSTEM AND METHOD FOR SYNCHRONIZED PRESENTATION OF VIDEO AND AUDIO SIGNALS

[75] Inventors: Lawrence F. Heyl, Mountain View, Calif.; Henry N. Kannapell, Gainesville, Ga.

[73] Assignee: Apple Computer, Inc., Cupertino, Calif.

[21] Appl. No.: 219,950

[22] Filed: Mar. 30, 1994

[51] Int. Cl.$^6$ .................................................. H04L 5/00
[52] U.S. Cl. .............................. 364/514 R; 370/100.1
[58] Field of Search ................... 364/514 R; 370/20, 370/100.1, 113; 369/30; 340/825.14, 825.15, 825.2

[56] References Cited

U.S. PATENT DOCUMENTS

| | | |
|---|---|---|
| 4,095,051 | 6/1978 | Crue . |
| 4,499,568 | 2/1985 | Gremillet ................................. 369/30 |
| 4,654,843 | 3/1987 | Roza et al. ............................... 370/20 |
| 4,727,495 | 2/1988 | Cheetham et al. .................. 364/514 C |
| 5,262,964 | 11/1993 | Bonsall et al. ...................... 364/514 A |

FOREIGN PATENT DOCUMENTS

| | | |
|---|---|---|
| 0281387 | 9/1988 | European Pat. Off. . |
| 0445532 | 9/1991 | European Pat. Off. . |
| 0618728 | 10/1994 | European Pat. Off. . |
| 3335675 | 5/1985 | Germany . |
| 2264608 | 9/1993 | United Kingdom . |

OTHER PUBLICATIONS

"Report 624–4, Characteristics of Television Systems," Reports of the International Radio Consultative Committee (CCIR), 1990, pp. 1–33 (no month).
International Radio Consultative Committee (CCIR) Recommendation 601–2 (1982–1986–1990) "Encoding Parameters of Digital Television for Studios"no month.
Langlais, et al.; *Symposium Record Broadcast 16th International TV Symposium;* pp. 428–433; Jun. 1989 (XP000041135).
*Signal Processing Image Communication;* vol. 4, 1992; pp. 153–159 (XP000273161).

*Primary Examiner*—Ellis B. Ramirez
*Assistant Examiner*—Thomas Peeso
*Attorney, Agent, or Firm*—David J. Larwood

[57] ABSTRACT

A system and method for synchronized presentation of audio and video signals initially stored on a computer. A single composite file containing synchronized information characterizing the signals is generated. The data in the file is supplied as a stream to the input of a demultiplexer. Data characterizing each signal is output through one of a plurality of outputs of the demultiplexer, and supplied to one of a plurality of signal processors that generates the respective signal.

13 Claims, 3 Drawing Sheets

SYSTEM AND METHOD FOR SYNCHRONIZED PRESENTATION OF VIDEO AND AUDIO SIGNALS

BACKGROUND OF THE INVENTION

The present invention relates generally to multimedia computer applications, and more particularly to the synchronized presentation of signals such as video and audio signals.

An increasing fraction of video presentations are computer-generated motion pictures and synchronized audio such as those produced with the QuickTime system of Apple Computer, Inc. (QuickTime is a registered trademark of Apple Computer, Inc.). Such multimedia presentations may be used for promotional, instructional or entertainment purposes. Often times, a multimedia presentation made with a comparatively expensive computer system is desired in a more ubiquitous format such as VHS consumer video tape. The present invention is an arrangement of computer hardware and software that allows video and audio information resident on the computer to be transformed to video and audio signals that may be viewed directly or recorded on video tape.

For the purpose of computer processing, synchronized video and audio data are currently kept in separate files. Time codes, which are binary sequences inserted into these files, are used to indicate the timing of the video and audio data, which are synchronized by being locked to a common time code reference. Examples of time codes that can be used are Society of Motion Picture and Television Engineers (SMPTE) and European Broadcasting Union (EBU) time codes.

Computer-stored video and audio presentations have heretofore been reproduced using independent video and audio interfaces as input-output (I/O) devices. The video and audio data are read from a mass storage device into random access memory (RAM) buffers in the main memory using separate I/O processes and held in the main memory at the same time. Separate I/O processes are then used to transfer the data from the main memory to the video and audio interfaces. The system must be fast enough to provide the data at rates corresponding to the sampling rates of the audio and video signals. While this approach allows the most general sort of image and sound manipulations, it is also expensive to implement due to the high processing and I/O speeds required.

Accordingly, an object of the present invention is to provide a system for transferring data to video and audio interfaces using a single I/O device.

Another object of the present invention is to provide a method for storing and presenting synchronized video and audio signals using and reading a single file.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

The present invention is directed to a system for providing synchronized signals. The system comprises a demultiplexer having an input and a plurality of outputs. When a composite digital data stream containing information characterizing the signals to be provided is supplied to the input, each output outputs demultiplexed digital information characterizing one of the signals. Data processors for converting the demultiplexed digital information to synchronized signals are connected to the outputs of the demultiplexer.

The method of the present invention is a method for generating synchronized signals. A file containing composite digital data containing information characterizing the synchronized signals is provided. The data of the file is then supplied as a data stream to the input of a system according to the present invention such as, for example, the one described above. The data may be an interleaved sequence of samples of the synchronized signals.

Because the video and audio digital data are precisely treated and composited while digital signals, a very high precision is maintained in their synchronization.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DESCRIPTION OF THE PREFERRED EMBODIMENT

Figure 1:
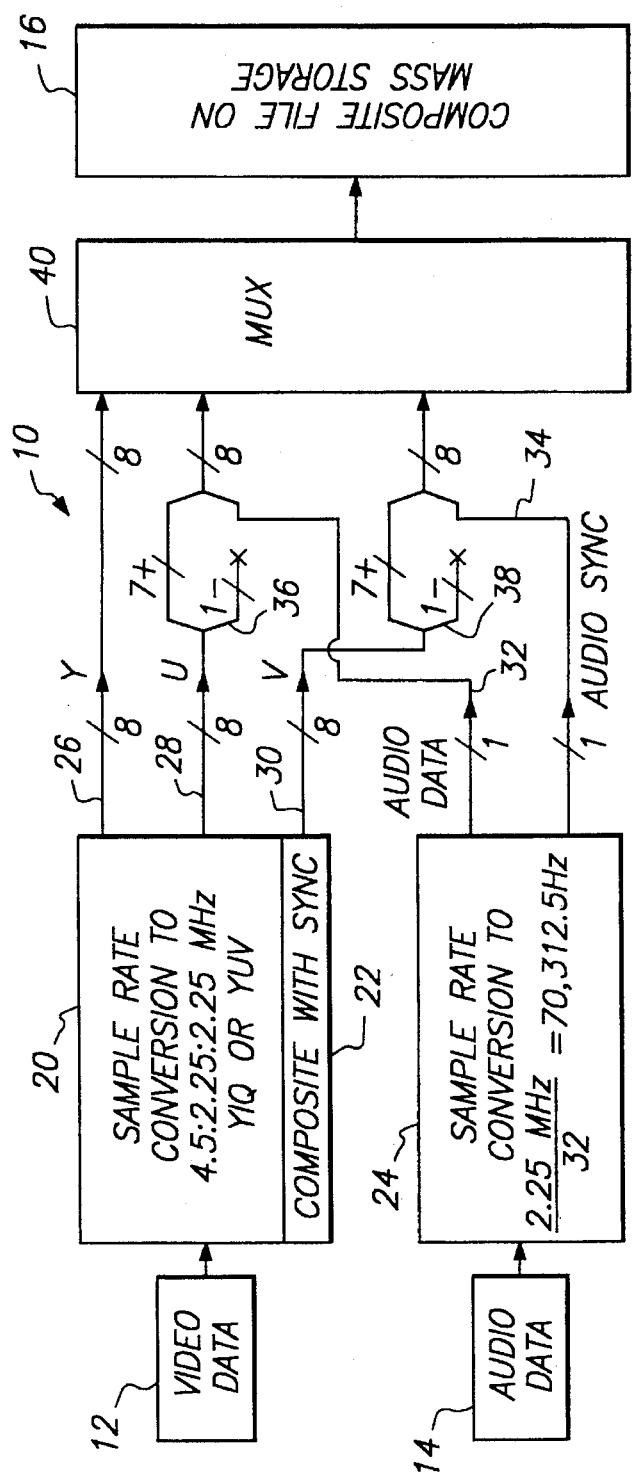
FIG. 1 is a schematic-block diagram of the processing of video and audio data held in separate files to obtain a composite file.
Figure 3:
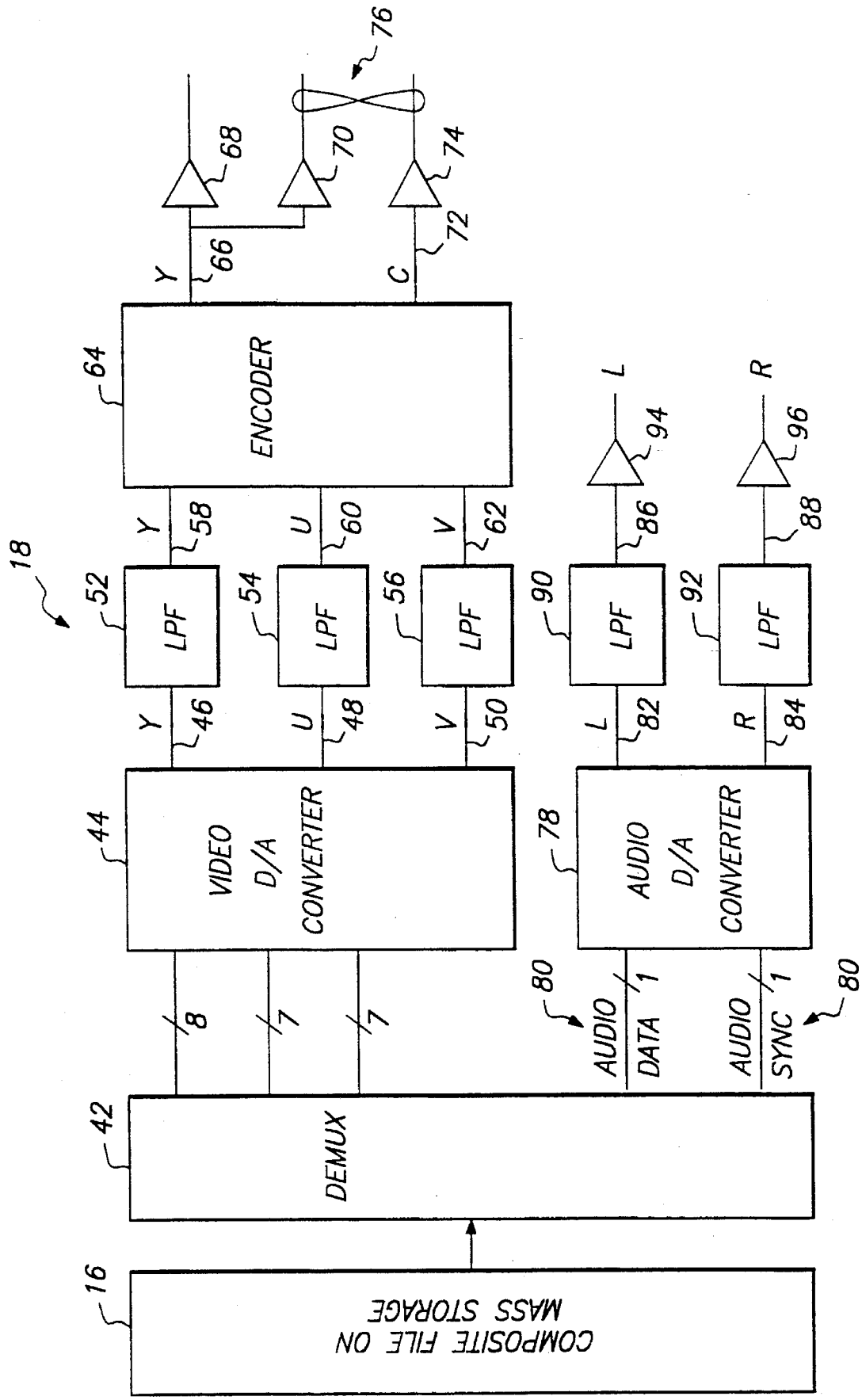
FIG. 3 is a schematic block diagram of a system for producing real time video and audio signals using data from a composite file.

The present invention will be described in terms of the preferred embodiment. The preferred embodiment is an apparatus and method for synchronized digital-to-analog conversion of video and audio signals. As shown in FIGS. 1 and 3, in the preferred embodiment of the present invention, image or video data 12 is read and composited with synchronization and blanking signals appropriate for National Television System Committee (NTSC) or Phase Alternation Line (PAL) television systems. These component video signals are then combined, as will be described below, with a serial digital audio stream derived from the sound or audio file data 14. The result is stored in a mass storage composite file 16 including video, video-sync and audio. Composite file 16 is then input to a decoder and signal processing circuit 18 (FIG. 3) which separates the video data for digital to analog reconstruction and television encoding, and the audio data for digital to analog reconstruction. The analog video and audio signals produced may be displayed on standard video and audio equipment.

Video data 12 and audio data 14 are band limited and held in digital form in separate files on a host computer. The data files are assumed to contain a synchronized presentation; that is, if the video and audio files are read out for use at their respective sampling rates starting at the same time, they will end at the same time.

As is well known, video images are represented electronically using a temporal succession of frames. Each frame consists of a plurality of continuous horizontal lines. A video image may be sampled temporally and vertically. Such sampling is necessary in order to represent an image having continuous extent in three dimensions (horizontal, vertical and time), using signals that are continuous in only one dimension (time). For each point on a horizontal line, three signal values are necessary to render a color image. The brightness of the point may be rendered using one of the signals, termed luminance, and the color information by two signals termed chrominance.

In the NTSC standard, the video signal runs at 29.97 frames per second (fps). In PAL standard, a frequency of 25 frames per second is used, which does not preclude the use of the present invention.

The input video data file 12 is assumed to represent an NTSC (nom. 30 fps) or PAL (25 fps) motion video sequence of Luminance (Y), In Phase Chrominance (U), and Quadrature Chrominance (V) samples represented in an 8 bit linear pulse-code modulation (PCM) format sited in accord with International Radio Consultative Committee (CCIR) Recommendation 601-2 (1982-1986-1990) "Encoding Parameters of Digital Television for Studios." It should be noted that the present invention may be practiced using other color spaces and chrominance signals such as YIQ. Because the output is intended for recording on standard video equipment, the video data is converted to a 4:2:2 sampling rate hierarchy for YUV, as indicated by block 20 in FIG. 1, resulting in sampling rates of 4.5 MHz (Y) and 2.25 MHz (U,V). This allows an adequate bandwidth for luminance and exceptional bandwidth for chrominance for signals destined for VHS. The image data is read line by line, normalized, and composited with samples generated in software representing NTSC or PAL synchronization and blanking as indicated by block 22.

The result is an aggregate 9 Megabyte/Sec data stream consisting of 8 bit YUV quantities, referenced in FIG. 1 as 26, 28 and 30, respectively. This quantization will achieve a nominal 49 decibel (dB) signal to noise ratio (SNR). As chrominance recording with an SNR ≦40 dB is acceptable, it is practical to discard the video information 36 and 38, held by the two least significant bits (LSBs) of the U and V chrominance channels, respectively. These bits can then be used to carry audio data. This use of the LSBs of the U and V chrominance channels reduces the composited video from linear PCM represented as 8:8:8 (bits/sample, YUV) to 8:7:7 (bits/sample, YUV). The scheme used to achieve the synchronization trades a small amount of chrominance SNR in order to insert a digital audio bit stream into the U and V chrominance channels. It can be seen that composite file 16 contains an interleaved sequence of samples for the signals to be played back in a synchronized fashion.

In the preferred embodiment, audio processing hardware 78 (FIG. 3) requires a serial audio data signal 80 and a serial audio synchronization signal 81 used to distinguish between data for the right audio channel and data for the left audio channel. Because these extra "serial channels" are sampled, as discussed above, at the chrominance rate of 2.25 MHz, and two 16 bit sound samples (the first for the stereo Left channel, the second for the stereo Right channel) are output alternately, the digital sound information may be sampled at 2.25 MHz/(2×16)=70.3125 kHz. This rate is not an obvious multiple of any of the accepted sound sampling rates of 48 kHz, 44.1 kHz or 32 kHz.

The conversion of signals to the 70.3125 kHz sampling rate is achieved by successive applications of digital sample rate changing techniques including finite impulse response (FIR) half-band interpolation and decimation, and linear interpolation indicated generally by block 24 of FIG. 1. These techniques are well known to those skilled in the art. The linear interpolation is used to precisely compute the interpolated output samples from the oversampled band limited input sequence. The precision required of the linear interpolator is a function of the synchronization precision desired. Maintaining synchronization precision with at worst one frame time in 30 minutes, or, (for NTSC) 1/(30 fps×60 Sec/min ×30 min)=1/54,000, can be easily seen to be near the limit of 16 bit arithmetic (1/65536). In the preferred embodiment, 32 bit arithmetic is used to dispense with this problem. After the sample rate conversion is achieved on the 16 bit PCM sound samples, the samples 32 (FIG. 1) are read in bit serial form and composited in place of the LSBs of the U chrominance samples 28. An audio sync signal 34 that indicates whether the bits of signal 32 are for the stereo Left channel or the stereo Right channel is also generated and composited in place of the LSBs of the V chrominance samples 30. The Y, U/audio-data and V/audio-sync signals are then multiplexed as indicated by block 40 of FIG. 1 and stored as a composite video/video-sync/audio-data/audio-sync file 16. This file is now in a form where it can be "played back" at a 9 Megabyte/Sec rate to realize the desired video and audio.

Figure 2:
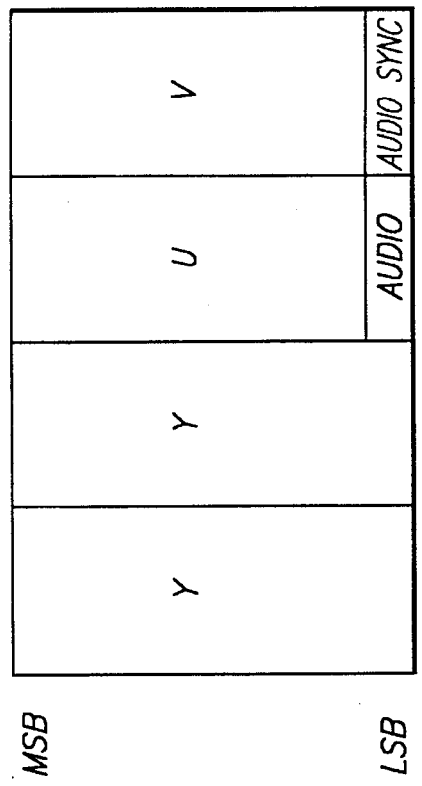
FIG. 2 is a diagram of the format of the composite file.
Figure 5:
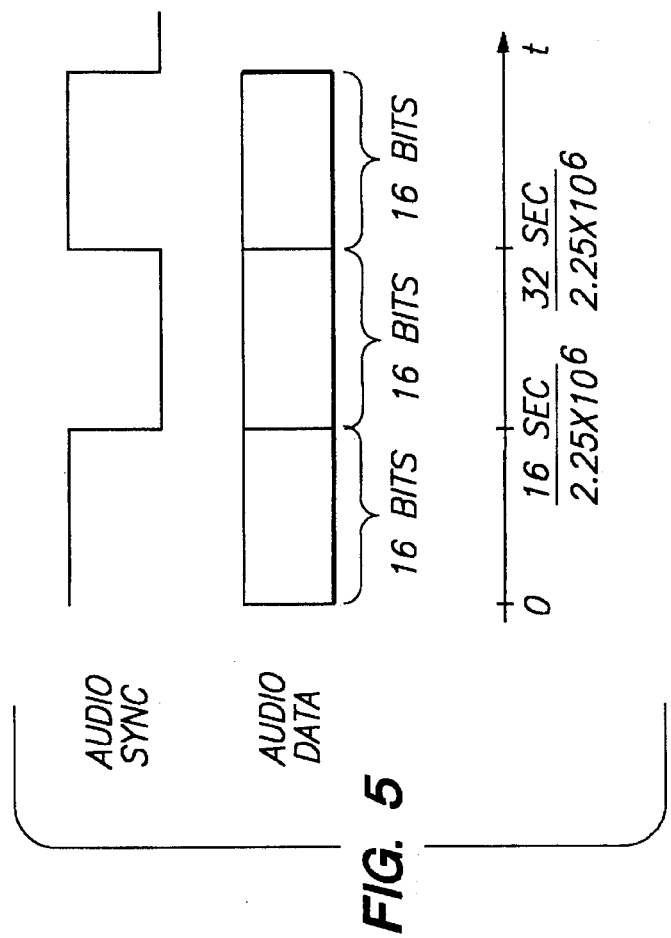
FIG. 5 is a timing diagram of the audio data outputs of the demultiplexer of the system of FIG. 3.

FIG. 2 illustrates a possible format for the composite file. Alternating U and V bytes are separated by Y bytes, resulting in twice as many Y bytes as there are U and V bytes. Only the seven most significant bits of the U and V bytes are used to hold video information. The LSB of the U bytes carries audio-data signal information. The LSB of the V bytes carries the audio-sync signal that indicates whether the LSB of the corresponding U byte has right audio channel or left audio channel information. Sixteen consecutive U LSBs are used for each audio sample, and the 16 bit sequences alternate between the left and the right audio channels. A timing diagram for three such 16 bit sequences is shown in FIG. 5. Audio data signal 80 is a one bit serial signal clocked at 2.25 MHz. It is a succession of alternating 16-bit words 102 and 104 each being a sample for the stereo Left channel and the stereo Right channel, respectively. Audio sync signal 81 alternates between two values and changes every 16 bits of the audio data signal.

The data processing described above, which concludes with the creation of composite file 16, does not need to occur in real time. It may be performed using a wide variety of combinations of hardware and software. In particular, it may be performed using a general purpose personal computer.

In order to produce the synchronized standard video and audio signals, the composite file is presented to the output hardware 18 of FIG. 3 as a 9 Megabyte/Sec stream. System 18 demultiplexes the video and audio, performs digital to analog reconstruction, and provides video encoding.

The digital data stream is demultiplexed by demultiplexer 42 to provide 8 bit Luminance and 7 bit U and V chrominance, and the 2 bit serial audio stream. As noted above, the 4.5 MHz sample rate of the Y luminance signal is twice the 2.25 MHz sample rate for the U and V chrominance signals.

Figure 4:
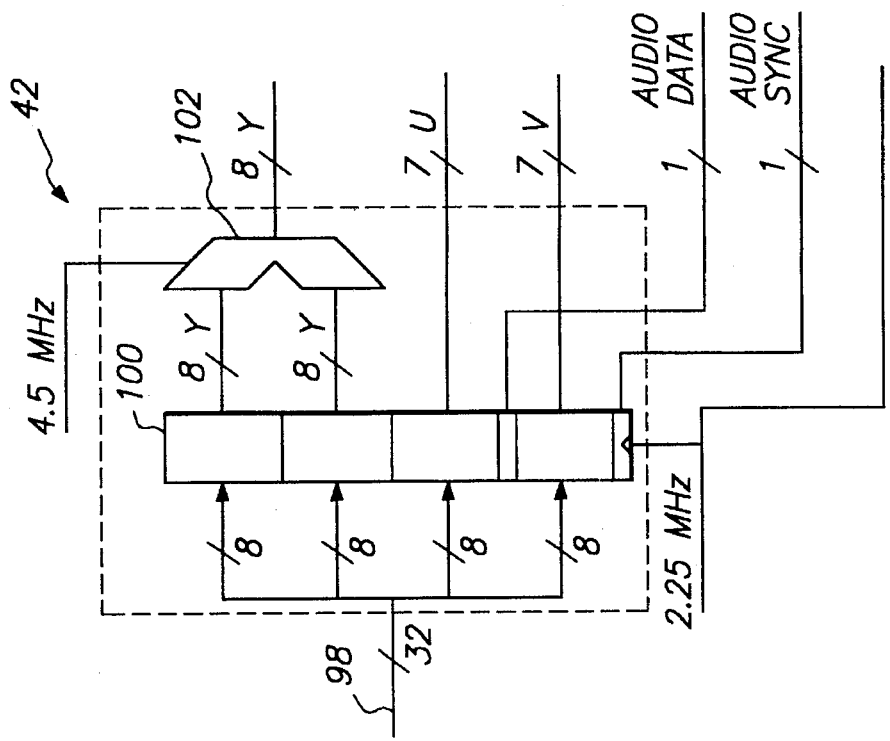
FIG. 4 is a schematic block diagram of the demultiplexer of the system of FIG. 3.

As shown in FIG. 4, demultiplexer 42 receives 32 bits of input 98 on every cycle of a 2.25 MHz clock and latches them using latches 100. The 7 bit U and V signals, and the 1 bit audio data and audio sync signals are output directly from their corresponding latches at a rate of 2.25 MHz. The two bytes of Y data are multiplexed using multiplexer 102 and output at a rate of 4.5 MHz one 8 bit sample at a time.

The data output by demultiplexer 42 is delayed (not shown) in order to minimize Half Amplitude Delay (HAD) on the eventual analog outputs. Data from the several outputs is processed in parallel by separate devices. The three video data streams are applied to a digital-to-analog (D/A) converter 44 which generates a zero order hold representation of the signal. Digital to analog converter 44 may be, for example, model CXD1178Q produced by Sony corporation. The three Y, U and V analog signals 46, 48 and 50, respectively, are then smoothed by low pass filters (LPF) 52, 54 and 56 respectively. These filters are 5th order with a Transitional Butterworth-Thompson response. This transfer function was chosen to give an acceptable step response for the video as well as to provide good discrete time signal image attenuation in order to suppress cross-color artifacts. The U and V channel filters have a lower cut-off frequency than the Y channel, and in consequence a greater group delay; this is compensated for, as mentioned, by delaying the luminance data so the HAD between the three channels is minimal. The output of these filters are YUV analog baseband signals 58, 60 and 62. The synthesis of such filters is taught, for example, in Anatol Zverev, *Handbook of Filter Synthesis*, John Wiley and Sons, 1967.

YUV analog baseband signals 58, 60 and 62 are then applied to a composite encoder circuit 64. This circuit consists of a subcarrier oscillator and a quadrature amplitude modulation (QAM) circuitry used to generate NTSC or PAL encoded chrominance. The subcarrier may be generated in a manner that is locked to the video raster if desired. This step is seen as optional as many VCRs are not phase coherent, i.e., the subcarrier - horizontal (SCH) phase is not well defined. A possible encoder is model CXA1219 available from Sony corporation.

The luminance output 66 from encoder 64 is then buffered using buffers 68 and 70, and made available to drive an S-video output 76, and also for separate use such as locking a video editor. As is known, an S-video output is comprised of a separate wire for luminance with synchronization pulses and a separate wire for the QAM encoded chrominance, to reduce cross-color distortion. The chrominance output 72 is also buffered using a buffer 74 and drives S-video output 76. Optionally, the hardware may be configured to supply a composite NTSC or PAL output.

The serial digital audio stream 80 and audio sync signal 81 are applied to a stereo digital-to-analog converter 78 that generates left and right analog signals 82 and 84, respectively. The digital-to-analog converter may be, for example, model TDA1543 produced by Philips BV, Eindhoven, The Netherlands. The baseband signals 86 and 88 are obtained using low-pass filters 90 and 92, and buffered using buffers 94 and 96, respectively. Buffers 94 and 96 may be used to drive an audio amplifier. The above techniques for recovering analog sound are similar to those used for Compact Disk (CD) digital audio applications.

The performance of hardware 18 is strongly influenced by the layout of its printed circuit board. The actual D/A conversion hardware may be advantageously located in a small volume such as a part of a computer peripheral card. Such a card would include a digital interface comprising demultiplexer 42, video D/A comprising converter 44, audio D/A comprising converter 78, analog reconstruction filters 52, 54, 56, 90 and 92, analog video processing 64, and regulated power to the analog components.

To avoid annoying impairments due to crosstalk between the digital, video, or audio sections, rigorous ground isolation should be provided. As is well known, such ground isolation may be accomplished by using a star ground system with different ground islands. Separate voltage regulators may be used to isolate the power supplies used for the various circuit functions.

By way of example, four ground islands may be provided. The digital logic 42 and the digital portion of the video D/A converters 44 may use one such island. A second island may be provided for the analog portion of the video D/A 44 and reconstruction filters 52, 54 and 56. If the reconstruction filters use emitter followers, these should be positioned over the ground plane for optimum stability. The capacitors determining the response of analog video reconstruction filters 52, 54 and 56 should be positioned within a well wherein the ground plane has been removed, in order to minimize the parasitic capacitance around the capacitors. Parasitic capacitance, in particular, will change the effective capacitance in the filters, and cause the filter response to be distorted or cause the filter corner frequency to drop. The composite video encoder 64 and output drivers 68, 70 and 74 may be positioned on a third ground island to decouple them from the video D/A 44 and filters 52, 54 and 56. This eliminates ground return paths that could cause high frequency oscillations or ground side noise coupling. The ground planes also reduce parasitic impedances that could adversely affect the stability of the output drivers. The audio section comprising D/A converter 78 and low-pass filters 90 and 92 maybe positioned on a fourth ground island, separated from the video section except at the star point, and located as close as possible to the audio output connectors.

In summary, an apparatus and method for synchronized digital-to-analog conversion of video and audio signals has been described.

The present invention has been described in terms of a preferred embodiment. The invention, however, is not limited to the embodiment depicted and described. Rather, the scope of the invention is defined by the appended claims.

What is claimed:

1. A system for providing synchronized wide and narrow bandwidth signals, comprising
    a channel for a composite digital data stream, said composite digital data stream comprising a first signal having a wide bandwidth and a second signal having a narrow bandwidth, said first and second signals composited as a single stream of synchronized data, and
    a demultiplexer having
        an input connected to said channel to receive said composite digital data stream,
        a first output providing first demultiplexed digital information corresponding to said first signal, and
        a second output providing second demultiplexed digital information corresponding to said second signal.

2. The system of claim 1 wherein said wide bandwidth is suitable for one or more video signals and said narrow bandwidth is suitable for one or more audio signals.

3. The system of claim 1 further comprising
    a first signal processor connected to said first output of said demultiplexer for converting said first demultiplexed digital information to a first synchronized output signal,
    a second signal processor connected to said second output of said demultiplexer for converting said second demultiplexed digital information to a second synchronized output signal, synchronized with said first synchronized output signal.

4. The system of claim 3 wherein each of said first and second signal processors comprises a digital-to-analog converter connected to a low-pass filter.

5. The system of claim 3 wherein said first signal comprises high frequency data having a plurality of high frequency components, wherein each of a first and a second high frequency component of said plurality of high frequency components is composited as a separate signal and synchronized with each other in said composite digital data stream.

6. The system of claim 5 wherein said second signal comprises low frequency data encoded as a first series of second bits and said first high frequency component encoded as a first series of first bits, said low frequency data and said first high frequency component synchronized by replacing one or more least significant bits of said first series of first bits with a corresponding number of bits from said first series of second bits.

7. The system of claim 6 wherein said second signal comprises low frequency data having a plurality of low frequency components, wherein a first low frequency component of said plurality of low frequency components is encoded as said first series of second bits and a second low frequency component of said plurality of low frequency components is encoded as a second series of second bits, and where said second high frequency component is encoded as a second series of first bits, said first low frequency component and said second high frequency component synchronized by replacing one or more least significant bits of said second series of first bits with a corresponding number of bits from said second series of second bits.

8. The system of claim 7 wherein said first high frequency component comprises video in phase chrominance data, said second high frequency component comprises video quadrature chrominance data, said first low frequency component comprises audio data, and said second low frequency component comprises audio synch data.

9. The system of claim 7 further comprising a television signal encoder having inputs connected to synchronized signals corresponding to said first and second outputs of said demultiplexer.

10. A method for generating a synchronized signal from synchronized, digitized wide and narrow bandwidth signals, said method comprising:

providing composite digital data comprising a first signal having a wide bandwidth and a second signal having a narrow bandwidth, said first and second signals composited as a single stream of synchronized data, supplying said composite digital data to an input of a system comprising a demultiplexer having a first output comprising a first output signal having said high frequency and a second output signal comprising said low frequency, said second output signal synchronized with said first output signal.

11. The method of claim 10 wherein said composite digital data is an interleaved sequence of samples of said first and second signals.

12. A method for generating a synchronized signal from synchronized wide and narrow bandwidth signals, said method comprising:

converting a first signal having a wide bandwidth to a first digital signal at a selected sampling rate, converting a second signal having a narrow bandwidth and synchronized with said first signal to a second digital signal at a selected multiple of said selected sampling rate, subdividing said second digital signal into units of one or more bits and replacing selected bits of said first signal with a corresponding number of said units of one or more bits of said second digital signal such that said first signal and said second signal are composited into a synchronized data stream.

13. The method of claim 12 for generating a synchronized signal wherein said first digital signal comprises samples of 24 bits, two of which bits are replaced by corresponding bits of said second digital signal.

\* \* \* \* \*